United States Patent Office 2,724,843
Patented Nov. 29, 1955

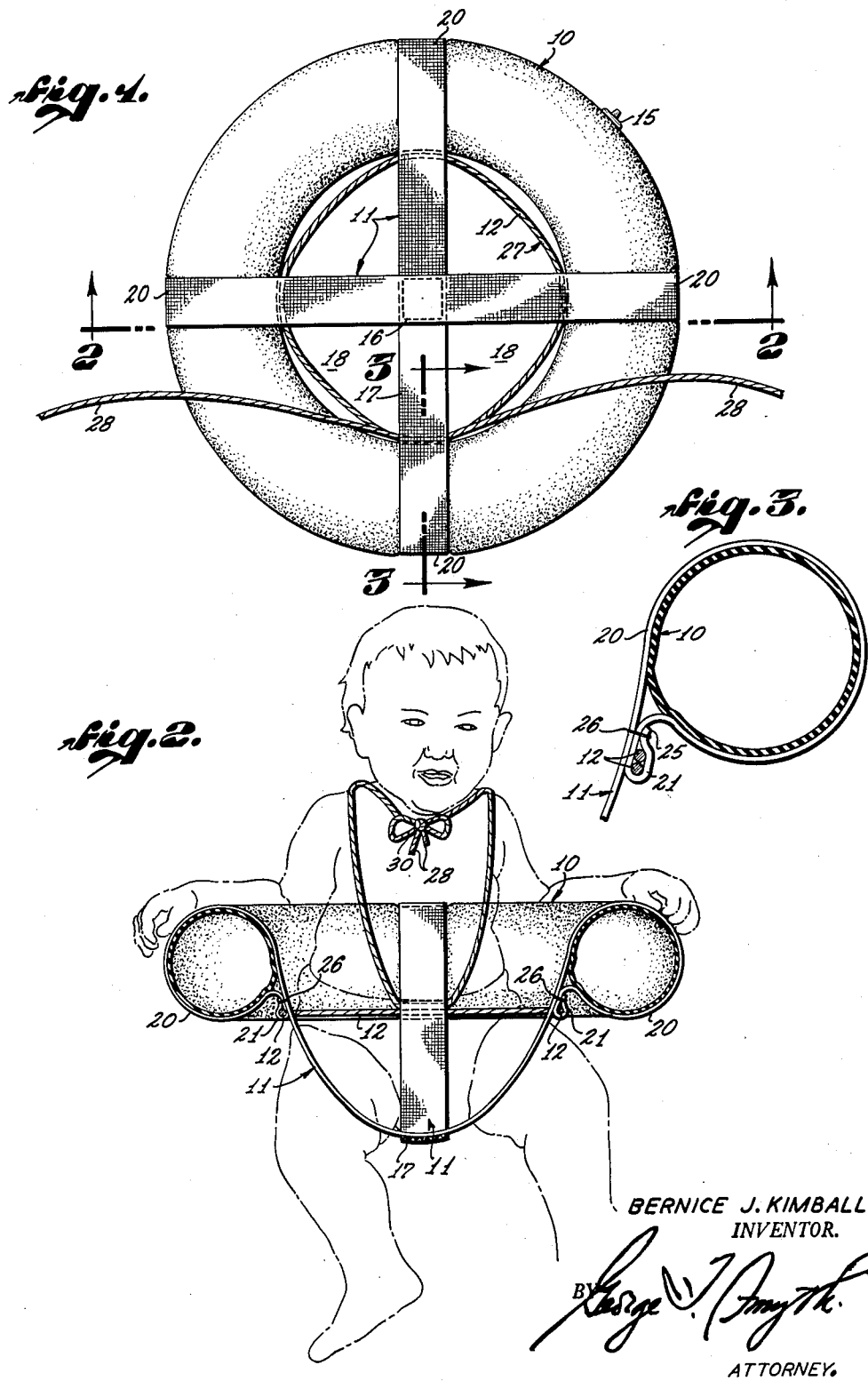

2,724,843

BATHER'S FLOAT

Bernice J. Kimball, Los Angeles, Calif.

Application November 13, 1953, Serial No. 391,852

5 Claims. (Cl. 9—17)

This invention relates to a float for use as a seat to support a bather in the water and is directed to a floating seat construction that is especially advantageous for use by young children.

A child's float that will serve as a non-sinkable seat and will effectively support the child in upright position will soon develop a desirable sense of security and familiarity with water. Some expedient should be provided for attaching the float structure to the body of the child to prevent separation of the float even when the child walks out of the water. It is also desirable that the float be comfortable both in the water and out of the water and afford maximum freedom for arm and leg movements in both instances. If such a float device is to be made commercially available, a further requirement is that it be of simple, inexpensive construction suitable for quantity production at low labor cost.

The invention in its preferred form meets these requisites by a simple combination of a ring-shaped float, a pair of straps and a cord-like flexible member. The pair of straps intersect and preferably are interconnected at their intersection to form a seat for the child below the level of the float with openings in the seat structure for the child's leg to extend downward. The four ends of the two intersecting straps are formed into major loops embracing the float for support of the seat structure therefrom. In addition, the four strap ends form minor loops to receive the flexible cord-like member so that the flexible member may cooperate with the straps to maintain uniform spacing of the straps and especially to prevent undue spreading of the seat structure. For this purpose, the cord-like flexible member is simply threaded through the minor loops at the four ends of the two straps and is formed into a closed loop interconnecting all of the strap ends.

A feature of the invention is that the cord-like flexible member is long enough not only to form the closed loop for interconnecting the strap ends, but also to provide two relatively long free ends. These two free ends of the cord-like member may be interconnected to form a support loop across at least one shoulder of the child for the purpose of making the float inseparable from the child.

The features and advantages of the invention may be readily understood by considering the following description, together with the accompanying drawing:

In the drawing, which is to be regarded as merely illustrative:

Figure 1 is a plan view of the presently preferred embodiment of the invention;

Figure 2 is a transverse section, taken as indicated by the line 2—2 of Figure 3, with the phantom figure of a child added thereto; and Figure 3 is an enlarged cross-section taken as indicated by the line 3—3 of Figure 3.

The selected embodiment of the invention illustrated by the drawings comprises the combination of a ring-shaped float member 10, two intersecting straps, each generally designated by numeral 11, and a flexible cord or small-diameter rope 12. The float member 10 may be of any suitable buoyant construction but preferably is an inflated or inflatable member which, as shown, is of the general character of an inner tube of an automobile tire. The tubular float member 10, which may be made of any suitable flexible plastic material, is preferably provided with a normally closed air valve 15 of conventional construction to permit the replenishment of air therein as required. The air valve 15 may be omitted, however, if it is desired to make the float member a permanently inflated member.

The straps 11 intersect centrally as best shown in Figure 1, and preferably are interconnected by suitable stitching 16 at their intersection to provide a seat structure comprising four radial strap portions. It is contemplated the child shown in phantom in Figure 2 will sit on three of the four strap portions and will straddle the fourth strap portion, the fourth strap portion being indicated at 17 in Figure 1. The four strap portions form four quadrant spaces and the child's legs extend downward through two of these quadrant spaces lying on opposite sides of the fourth strap portion 17, the two quadrant spaces being designated by numeral 18 in Figure 1.

In the preferred construction of the invention illustrated by the drawing, each of the four ends of the two straps 11 is doubled back on itself, as best shown in Figure 3, to form a major loop 20 embracing the float member 10 and is again doubled back on itself in a reverse manner to form a minor loop 21 to receive the flexible cord 12. This doubling back of a strap end on itself to form the major loop and the reverse minor loop results in three thicknesses of the strap being adjacent each other in overlapping relation at each strap end 25 and it is contemplated that these three plies of the strap will be interconnected or fastened together for permanent maintenance of both the major loop 20 and minor loop 21. The three strap thicknesses at the strap end 25 may be interconnected by suitable stitching 26. Thus, the two ends of the two straps 11 are permanently connected to the float member 10 by the major loops 20 for suspension of the described seat structure therefrom.

The flexible member or cord 12 is threaded through the four minor loops 21 at the four ends of the two straps 11 and is preferably threaded twice through the minor loop 21 in the strap portion 17 that extends forward from the seated child. In this manner, the flexible member 12 forms a closed loop, generally designated 27, with two free ends 28 of the cord in front of the seated child. As may be seen in Figure 1, the closed loop 27 interconnects the four strap ends. Preferably the closed loop 27 is of approximately the inside diameter of the float member 10 to position all of the minor loops 21 of the straps substantially on that diameter. Thus, the closed loop 27 of the flexible member 12 keeps the suspended seat structure from spreading radially, i. e., keeps the minor loops 21 of the straps from shifting outward towards the outer diameter of the float member 10. With the flexible member 12 free to slide through the minor strap loops, the flexible member may be tightened or loosened to vary the diameter of the closed loop 27 and thus vary the size of the seat in accord with the size of the child. The flexible member 12 may, however, be suitably bonded to the straps at each of the minor strap loops 21, if desired, by suitable waterproof adhesive material, for example, so that the flexible member additionally serves as means for maintaining uniform circumferential spacing of the strap ends.

The two free ends 28 of the flexible member 12 may be of ample length to permit the free ends to be used as means for attaching the described structure to the body of the child and for this purpose the two free ends 28 may be adapted for releasable interconnection in any suitable manner. In the particular arrangement shown in Figure 2, each of the two free ends 28 of the flexible member passes upward over the chest and one shoulder of the child and then around the other shoulder and to the front. The two free ends meet at the front and are formed into a knot 30 for releasable interconnection.

It is apparent that the described float assembly will support a child in upright position in the water in the manner indicated in Figure 2 and will provide ample freedom for the child to move his arms and legs. Should the child stand up or walk out of the water, the float structure will be carried along by the child's body in a manner that permits full freedom of movement of the child's arms and legs. When the child again returns to the water, the float will be properly positioned to resume its normal buoyant support of the child's body in the water.

My description herein of the presently preferred embodiment of the invention will suggest to those skilled in the art various changes, substitutions and other departures from my disclosure that properly lie within the spirit and scope of the appended claims.

I claim:

1. In a bather's float of the character described, the combination of: a ring-shaped float dimensioned to surround the body of the bather; means including a plurality of straps providing a seat for the bather, each of said straps at each end thereof being doubled back on itself once and permanently attached to itself to form a major loop completely embracing a radial section of the float and being doubled back again to form an adjacent minor loop; and a flexible member threaded through said minor loops, adapted to pass over the body of the bather thereby to hold the float to the body of the bather.

2. A bather's float as set forth in claim 1 in which said seat comprises two intersecting straps interconnected at their intersection.

3. A bather's float as set forth in claim 1 in which said flexible member forms a loop of a diameter of the order of magnitude of the inner diameter of said float to limit spreading of said seat.

4. A bather's float as set forth in claim 1 in which each of the straps is doubled back on itself the second time in a reverse manner to bring three thicknesses of the strap together at the strap end; and in which said three thicknesses are permanently interconnected.

5. In a bather's float of the character described, the combination of: a ring-shaped inflatable tubular float member; a plurality of intersecting interconnected straps forming a seat for the bather, each of said straps at each end thereof being doubled back on itself once and permanently attached to itself to form a major loop completely embracing a radial section of said float member and being again doubled back on itself in the reverse direction to form a minor terminal loop with three strap thicknesses adjacent each other at the strap end; means interconnecting said three strap thicknesses at the ends of each of said straps to maintain said major and minor loops; and a flexible member threaded through said minor loops, said flexible member being threaded twice through one of the minor loops to form a closed loop of approximately the inside diameter of said float member to position minor loops approximately on said diameter, said flexible member having free ends for interconnection around the bather's body to hold said float member against movement relative to the bather's body.

References Cited in the file of this patent

UNITED STATES PATENTS

| | | |
|---|---|---|
| 1,748,170 | Chestnut | Feb. 25, 1930 |
| 2,023,314 | Doron | Dec. 3, 1935 |
| 2,051,281 | Webber | Aug. 18, 1936 |
| 2,075,374 | Tucker | Mar. 30, 1937 |
| 2,246,108 | Sermon | June 17, 1941 |